(12) United States Patent
Haag et al.

(10) Patent No.: US 6,203,480 B1
(45) Date of Patent: Mar. 20, 2001

(54) PRESSURE PROCESSING ROLL

(75) Inventors: Rolf Van Haag, Kerken; Reinhard Wenzel, Krefeld, both of (DE)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 0 days.

(21) Appl. No.: 09/306,842

(22) Filed: May 7, 1999

(30) Foreign Application Priority Data

May 16, 1998 (DE) ............................................. 198 22 144

(51) Int. Cl.$^7$ ...................................................... B23P 15/00
(52) U.S. Cl. ................................................ 492/16; 492/20
(58) Field of Search ................................. 492/7, 16, 20; 162/138.2

(56) References Cited

U.S. PATENT DOCUMENTS

| | | | | |
|---|---|---|---|---|
| 3,799,629 | * | 3/1974 | Laing | 384/108 |
| 3,827,767 | * | 8/1974 | Sinner | 384/113 |
| 3,887,249 | * | 6/1975 | Rouch | 384/31 |
| 4,185,879 | * | 1/1980 | Hars et al. | 384/99 |
| 4,520,723 | | 6/1985 | Pav et al. | |
| 5,033,317 | * | 7/1991 | Van Haag | 492/7 |
| 5,208,956 | * | 5/1993 | Wenzel et al. | 492/5 |
| 5,329,849 | * | 7/1994 | Roerig | 492/20 |
| 5,788,619 | * | 8/1998 | Brown et al. | 492/7 |
| 5,795,073 | | 8/1998 | Arvidsson et al. | |

FOREIGN PATENT DOCUMENTS

| | | |
|---|---|---|
| 1525252 | 9/1969 | (DE) . |
| 1575399 | 1/1970 | (DE) . |
| 241106 | 11/1986 | (DE) . |
| 3822438 | 3/1989 | (DE) . |
| 3348209 | 12/1989 | (DE) . |
| 4015245 | 9/1991 | (DE) . |
| 4209712 | 9/1993 | (DE) . |
| 2143302 | 2/1985 | (GB) . |
| 95/08067 | 3/1995 | (WO) . |

\* cited by examiner

*Primary Examiner*—I Cuda
(74) *Attorney, Agent, or Firm*—Greenblum & Bernstein, P.L.C.

(57) ABSTRACT

Pressure processing roll with a roll jacket, the roll jacket rotatably mounted on a carrier by a bearing arrangement. The bearing arrangement has at least one hydrostatically supported bearing surface, which forms a gap with an opposing surface. A normal to the hydrostatically supported bearing surface, and therefore a normal force, has at least one axially oriented component. The bearing arrangement is acted upon by a predefined axially oriented force which substantially completely closes the gap in the absence of hydrostatic pressure in the hydrostatically supported bearing.

21 Claims, 2 Drawing Sheets

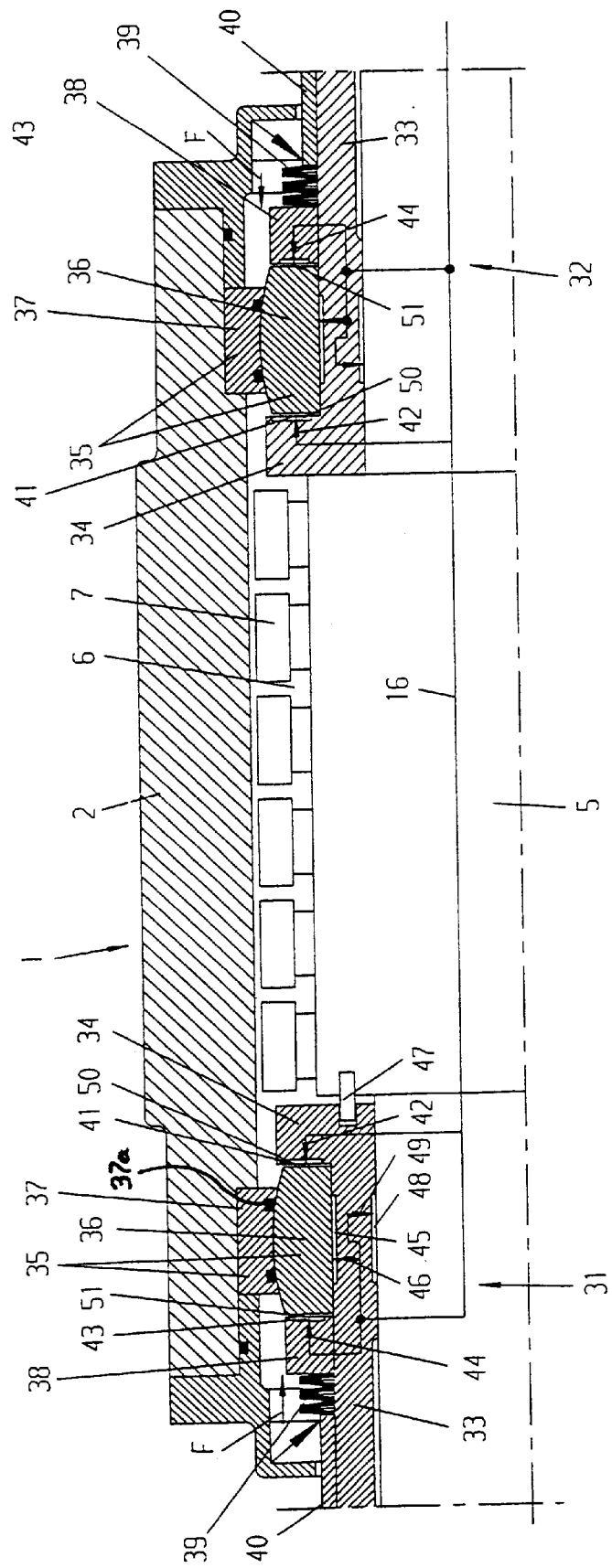

PRESSURE PROCESSING ROLL

CROSS-REFERENCE TO RELATED APPLICATIONS

The present application claims priority under 35 U.S.C. §119 of German Patent Application No. 198 22 144.4, filed on May 16, 1998, the disclosure of which is expressly incorporated by reference herein in its entirety.

BACKGROUND OF THE INVENTION

1. Field of the Invention

The invention concerns a pressure processing roll with a roll jacket, the roll jacket being rotatably mounted on a carrier by a bearing arrangement.

2. Description of Background Information

A pressure processing roll in which the bearing arrangement has at least one hydrostatically supported bearing surface, which forms a gap with an opposing surface, is known from German Patent No. DE 33 48 209 C2.

Such rolls are suitable for numerous applications, for example, for calenders; smoothing machines; press sections of paper, pulp, and printing machines; or rolling mills for steel, plastic, and the like. The roll works with an opposing roll such that a material web can be guided through between the two rolls and processed under pressure in the nip between the two rolls.

In this process, the roll jacket may sag. When the roll jacket sags, a nonuniform nip will develop over the axial length of the roll. However, usually, some mechanism is provided in such pressure processing rolls to oppose the sagging of the roll jacket. The mechanism may be, for example, a set of support shoes which are disposed between the roll jacket and the carrier (roll jacket carrier). The roll jacket may be alternatively provided with a hollow interior or cavity, which is subdivided into two or more chambers in the circumferential direction, the chamber adjacent to the nip being placed under the pressure of a hydraulic fluid.

Where the pressurized hydraulic fluid is used to counteract the sagging of the roll jacket, in all cases in which an elevated pressure exists in the interior of the roll jacket, it is necessary to seal the cavity or interior of the roll jacket by transverse seals of the ends of the roll. In these transverse end seals, parts which are movable relative to each other must work together, which causes significant wear. Moreover, the wear increases with the operational speed of the roll. It is not necessary, however, that the transverse end seal completely prevent the escape of hydraulic fluid. The task of the transverse end seals is rather to maintain the pressure in the interior of the roll jacket at a specific level.

SUMMARY OF THE INVENTION

In view of the shortcomings of the prior art, an object of the invention is to provide a transverse end seal for the interior which operates with low wear even at high speeds.

According to one aspect of the present invention, a pressure processing roll, having an axis, includes a carrier and a roll jacket. A bearing arrangement rotatably mounts the roll jacket on the carrier, and has one or more hydrostatically supported bearing surfaces that form a gap with an opposing surface (e.g., within the bearing), a normal force of the hydrostatically supported bearing surface having an axially oriented component. An axial pressure mechanism applies a predetermined, axially oriented force on the bearing arrangement in the direction of the axis to substantially completely close the gap in the absence of hydrostatic pressure in the hydrostatically supported bearing surface or surfaces.

In another aspect of the present invention, a pressure processing roll connectable to a hydraulic system includes a substantially cylindrical roll jacket having a hollow interior; and a carrier within the roll jacket, the carrier extending along a rotational axis of the roll jacket. A first bearing at one end of the roll jacket and a second bearing at the remaining end of the roll jacket connect the carrier and the roll jacket. Each of the first and second bearings have a hydrostatic gap between two internal surfaces of the bearing that are transverse to the rotational axis. The hydrostatic gaps hydrostatically support the ends of the roll jacket when pressurized by the hydraulic system. A gap closing mechanism applies pressure to the second bearing in a direction transverse to the rotational axis, to close the hydrostatic gaps when the hydraulic pressure in the hydrostatic gaps is lower than a predetermined pressure. The gap closing mechanism closes off the hollow interior of the roll jacket by closing the hydrostatic gaps.

That is, the object is accomplished in a pressure processing roll of the type mentioned in the introduction in that the bearing arrangement is acted upon by a predefined, preferably axially oriented force, which substantially completely closes the gap or gaps in the absence of the hydrostatic pressure.

The axially oriented force thus counteracts the hydrostatic pressure which prevails in the gap or gaps. Thus, the gauge of the gap can be set or maintained at a predefined value. When the hydrostatic pressure drops or even disappears, for example, during an interruption in operation (or when shut down), the gaps are closed by the axially acting force such that no hydraulic fluid can leak from the hollow interior of the roll jacket through the nip. Likewise, during operation, no fluid can leak from the interior or cavity since the hydrostatic pressure (which is, as a rule, at least as great as the hydraulic pressure in the interior or cavity of the roll jacket) prevails in the nip. For example, where the hollow interior is pressurized by a hydraulic system, and the hydrostatic gaps connect the hollow interior and an exterior of the roll jacket, the first and second hydrostatic gaps may be pressurized by the hydraulic system to a pressure no less than a pressure of the hollow interior, thereby maintaining the pressure of the hollow interior. To be sure, hydraulic fluid will pass out through the gaps; however, no loss of pressure in the interior of the roll jacket is associated with the passage of the hydraulic fluid through the gaps.

In one modification, the bearing arrangement includes at least one bearing having an inner ring and an outer ring, and the inner or the outer ring is divided in two parts in a radial direction of the pressure processing roll, the two parts being a radially inner part and a radially outer part. The radially inner part has a concave arch on a radial outer side, and the radially outer part has a convex arch on a radially inner side, adapted to the concave arch. The two arches thus work together such that the outer ring can execute a tilting motion on the inner ring; or the inner ring, in the outer ring. Thus, the sag of the carrier (which passes through the roll jacket) under load is taken into account. Under such sag, the carrier has, on the ends where the bearing or bearings are disposed, a certain inclination such that the axis of the carrier at the bearings no longer coincides with the rotational axis of the roll jacket. Based on the modification described, tilting is permitted without the occurrence of additional wear occurring.

In such a case, the concave arch and the convex arch may each have a constant radius. In other words, each of the first and second bearings further includes a spherical journal bearing formed therein for permitting relative tilt of the carrier and the roll jacket. Thus, particularly large tilt angles can be realized without the risk that the pressure in the interior can leak at the contact surface between the inner ring and the outer ring. Further, each spherical journal bearing may include at least one seal at this contact surface, e.g., in an interfacing portion of the spherical journal bearing.

The inner ring may be the ring that is divided in two in the radial direction into the radially inner part and the radially outer part. In this case, when the carrier sags, the inner ring assumes an angle immediately, i.e., the inner ring is tilted relative to the outer ring. Additional movements do not have to occur until there is a change in the sag of the carrier. If the outer ring, instead, is divided, a tilting motion occurs with every revolution of the roll.

The axial pressure mechanism may include a hydraulic piston-cylinder arrangement that generates the predetermined, preferably axially oriented force. With a hydraulic piston-cylinder arrangement, a constant force can be maintained over a certain displacement path, since the pressure remains the same in every position. The force can be readily adjusted depending on dimensions or applied loads, and, therefore, can be adapted to different operating conditions.

Advantageously, the bearing arrangement has a fixed bearing and a movable bearing, and the hydraulic piston-cylinder arrangement applies the predetermined, preferably axially oriented force on the movable bearing to substantially completely close the gap or gaps in the absence of hydrostatic pressure in the gaps. In other words, a first bearing is fixed in the direction of the rotational axis, and a second bearing is movable within a clearance in the direction of the rotational axis. As noted, the gap closing mechanism may apply pressure to the second bearing in an axial direction of the rotational axis to close the hydrostatic gaps. Thus, it is possible to apply the necessary force even with a displacement of the movable bearing (e.g., using the piston-cylinder arrangement, which must have the necessary stroke and opposing clearance).

In one particular embodiment, the bearing arrangement includes two hydrostatic bearings, and the two hydrostatic bearings have gaps that are conically inclined with an opposing angle of inclination to one another. That is, two internal surfaces of the hydrostatic gaps of the bearings are conically shaped, and the two internal surfaces of the first bearing have an opposing angle of inclination to the two internal surfaces of the second bearing.

In this manner, a single gap per bearing is sufficient, the hydrostatic support being in the gap, i.e., a hydraulic fluid under pressure being fed into the gap. This arrangement simplifies the arrangement of lines and control. It should be noted that the largest component of force is, in most cases, radially oriented. Accordingly, the angle of inclination of the conically inclined gap, with respect to the rotational axis of the roll jacket, will usually be smaller than 45°. If the normal to the surface, i.e., a straight line perpendicular to the hydrostatically supporting bearing surface, is divided into radial and axial components, then the axial component will be substantially smaller than the radial component. With this design, the roll jacket is fixed in a tong-like manner by the two bearings, even when the roll jacket changes length, for example, because of the effects of temperature. In such a case, the entire movable bearing is displaced. The preferably axially acting force continues to maintain the gaps in the two hydrostatic bearings at a predefined value.

In another embodiment, the bearing arrangement includes at least one hydrostatic bearing which has two gaps running in the circumferential direction and perpendicular to the axial direction, and one gap running in the circumferential direction and parallel to the axial direction. That is, the two internal surfaces of the hydrostatic gaps of the bearings extend circumferentially about the rotational axis and perpendicular to the rotational axis. In contrast to the structure known from German Patent No. DE 33 48 209 C2, the gaps are always kept "leak proof", i.e., the gaps are either closed, when the hydrostatic pressure is absent, or the gaps are automatically set to an optimum value when the hydrostatic action occurs.

In this embodiment, one or more hydrostatic bearings may includes a bearing housing, an outer ring, a projection, and a pressure ring, where the outer ring is disposed on the bearing housing and gripped in the axial direction between the projection and the pressure ring. The bearing housing forms the inner ring, and bearing thus forms a unit which can be handled as a whole and in which, for example, it is possible to slide the carrier (bearing) housing onto the carrier. The preferably axially oriented force then acts against the thrust collar (pressure ring), which axially holds the outer ring, which is, in turn, connected with the roll jacket.

In this case, one or more hydrostatic bearings further include a pressure spring that acts on the pressure ring. The pressure spring may be designed, for example, as a disk spring. Since no relatively large changes in length occur within a bearing with this structure, it is possible to set a fixed value of the force by pre-loading the pressure spring, and the force is then maintained during operation. In this case it is preferable to structure such a unit with one fixed bearing, the other bearing being movable, i.e., displaceable, on the carrier.

In one particular variation, the opposing surface has a pressure pocket formed therein, and the opposing surface and the pressure pocket are formed in a portion of the bearing arrangement that is not rotatable relative to the carrier (e.g., in a portion of the hydrostatic bearing or bearings that is not rotatable relative to the carrier). This structure simplifies the supply of the hydraulic fluid required for the buildup of the necessary hydrostatic pressure.

In another particular arrangement, the movable bearing is hydrostatically mounted on the carrier. In this case, a torque support may be used to prevent entrained rotation of the bearing on the carrier. The hydrostatic mounting of the bearing on the carrier enables easier axial displacement. Further, since hydraulic fluid under pressure is already available, no significant additional expense results from the hydrostatic mounting of the bearing on the carrier.

BRIEF DESCRIPTION OF THE DRAWINGS

The present invention is further described in the detailed description which follows, in reference to drawings by way of non-limiting examples of exemplary embodiments of the present invention, in which like reference numerals represent similar parts throughout the drawings, and wherein:

FIG. 2 shows a second embodiment of a roll according to the invention, in cross-section.

DETAILED DESCRIPTION OF THE INVENTION

Figure 1:
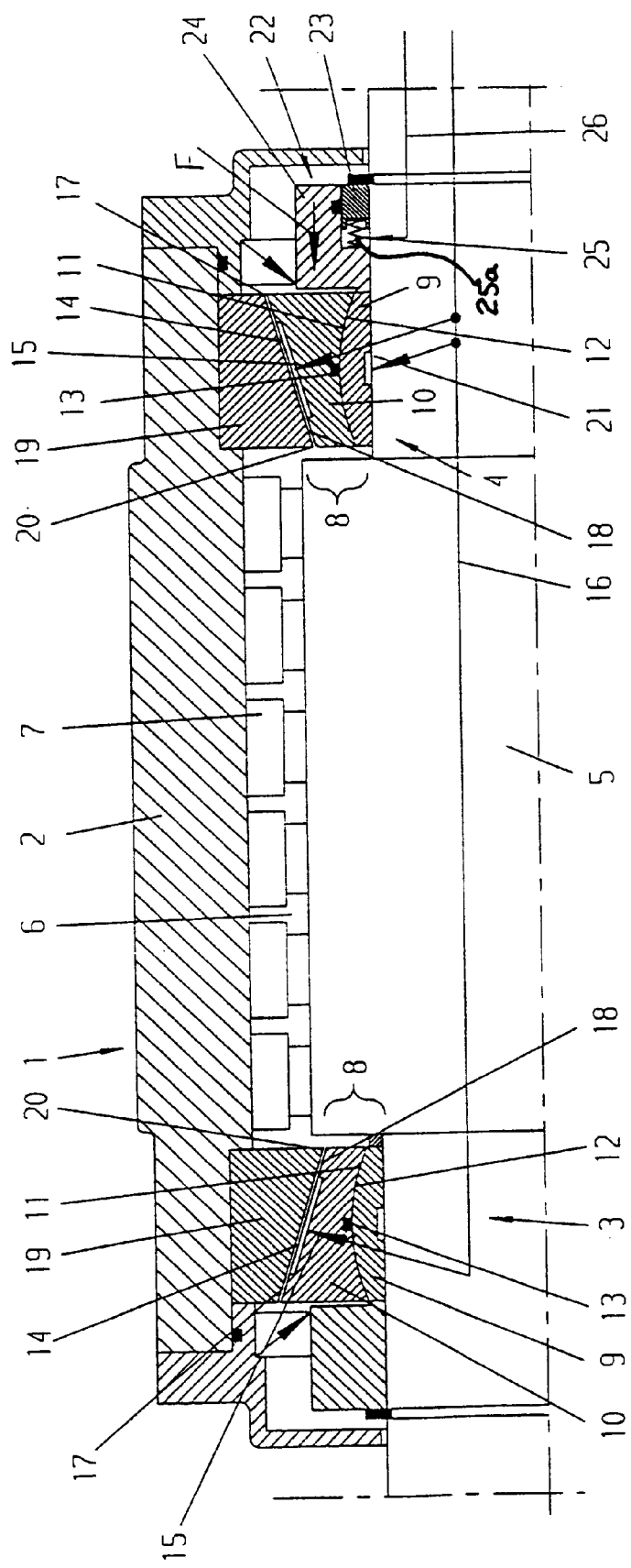
FIG. 1 shows a first embodiment of a roll according to the invention, in cross-section.

The particulars shown herein are by way of example and for purposes of illustrative discussion of the embodiments of the present invention only, and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

As shown in FIG. 1, a pressure roll 1 has a hollow roll jacket 2, which is rotatably mounted on a carrier 5 by a first hydrostatic bearing 3 and a second hydrostatic bearing 4. The carrier 5 is also referred to herein as a crosspiece 5. A plurality of hydrostatic support elements 7 are disposed, in a hollow interior 6 of the roll jacket 2, between the carrier 5 and the roll jacket 2. It should be noted that hereinafter, the "axial direction" is the direction of the axis of the roll 1, and the "radial direction" is the direction of the radius of the roll 1. Those members which are generally concentric to the roll 1 will share the same axial and radial directions. A force which is not along in the axial or radial directions is dividable into orthogonal axial and radial components.

The hollow interior 6 may be subdivided in the circumferential direction and pressurized in sections in a conventional manner. One example of such subdivision would require supplying a hydraulic fluid into one-half of the hollow interior 6. In this case, the hydrostatic support elements 7 may serve either for reinforcement, or for attenuation of the force produced in the interior 6 by the hydraulic pressure.

The bearings 3, 4 have essentially the same structure, i.e., either may be reversed in direction and substituted for the other. Each bearing 3, 4 has an inner ring 8 and an outer ring 19. The inner ring has a radially inner part 9 and a radially outer part 10. The radially inner part 9 is disposed on the carrier 5. The radially inner part 9 has a cap-shaped surface 11 on its radially outer side, i.e., a convex arch surface 11 which has a constant radius in the section depicted and constant radius perpendicular to the section depicted. The two constant radii are preferably, but not necessarily, the same, with the roll axis as the center point, i.e., the cap-shaped surface 11 is preferably spherical. The radially outer part 10 has, on the radially inward side thereof, a concave arch surface 12 corresponding to the convex arch surface 11 (e.g., having matching radii). The contact surface between the two surfaces 11, 12 may be sealed by a seal 13, which prevents the excessive escape of hydraulic fluid and maintains internal pressure in the interior 6. The radially inner part 9 can be tilted somewhat relative to the outer part 10 of the inner ring 8 via the arch of the surfaces 11, 12, to enable sagging of the carrier 5 relative to the roll jacket 2. The surfaces 11, 12, if spherical, may constitute together a spherical journal bearing (each having a spherical frustrum form).

It is advantageous that the inner ring 8 is divided instead of the outer ring 19. That is, through the subdivision of the inner ring 8, relatively low-wear operation is enabled. When the carrier 5 sags, the inner ring 8 assumes a compensating angle immediately, i.e., the inner ring 8 is internally tilted relative to the outer ring 19. Additional movements do not have to occur until there is a change in the sag of the carrier 5. In contrast, if the outer ring 19 is divided, a tilting motion must occur with every revolution of the roll 1. However, as noted, when the inner ring 8 is the divided ring and the carrier 5 sags, only a single movement between the two parts 9, 10 of the inner ring 8 is necessary to obtain a new adjustment.

A pressure pocket 14 (or "bearing pocket"), which is connected with a feed line 16 via a throttle or valve 15, is disposed on the radially outer side of the inner ring 8. With respect to the first embodiment, the radially outer side of the inner ring 8 includes an opposing surface 17, which forms a gap 20 with a bearing surface 18 formed on the radially inner side of the outer ring 19. The gap 20 (and accordingly both surfaces 17, 18) is formed in the shape of a frustrum of a cone, i.e., the surfaces 17, 20 each form a part of a conic surface. The bearings 3, 4 are mounted in opposing directions. Consequently, the two gaps 20, 20 of the bearings 3, 4 are inclined toward the axial center of the carrier 5, but in opposite directions. Accordingly, a normal force to the bearing surface 18, i.e., a force that acts along a straight line perpendicular to the bearing surface 18, has a component which points in the radial direction and, usually, depending on the angle of the surfaces 17, 18 and the radial and axial forces supported, a smaller component which points in the axial direction.

Preferably, the bearings 3, 4 of the bearing arrangement are two hydrostatic bearings 3, 4, having gaps 20, 20 that are inclined conically, with an opposing angle of inclination. The angles of inclination of the gaps 20, 20, though opposing, are preferably equal in amount. That is, each surface 18 in the first embodiment includes a hydrostatically supported bearing surface opposing the surface 17. It is, therefore, possible that a single gap 20 per bearing 3 or 4 is sufficient, since hydrostatic support is provided in the gap 20, i.e., a hydraulic fluid under pressure must be fed into the gap 20. This arrangement simplifies the arrangement of lines 16 and control, e.g. control throttles or valves (including throttles or valves 15, 18, 22, etc., as described herein). As noted above, the largest component of force is, in most cases of operation, radially oriented. If a normal to the bearing surface 18, i.e., a straight line perpendicular to the bearing surface 18, is divided into a radial and an axial component, as noted, then the axial component is usually substantially smaller than the radial component. In such a case, the angle of inclination with the rotational axis of the roll jacket 1, 2 will be preferably smaller than 45°. Accordingly, with this structure, the roll jacket 1, 2 is fixed from both axial ends by the two opposing bearings 3 and 4.

In the embodiment shown in FIG. 1, the bearing 3 is designed as a fixed bearing, i.e., the radially inner part 9 of the inner ring 8 is held stationary on the carrier 5 in the both axial direction and the circumferential direction, for example, by members fixed to the roll on either axial side of the bearing, and/or by friction, pressure, or a torque support member about the axis of the carrier 5. The outer ring 19 is fixedly connected to the roll jacket 2, e.g., is held stationary relative to the roll jacket 2, optionally be the same or similar means.

Further, in the embodiment shown in FIG. 1, the bearing 4 is designed as a movable bearing, i.e., the radially inner part 9 of the inner ring 8 is displaceable in the axial direction on the carrier 5. When the roll jacket 2 changes length, for example, because of the effects of temperature, the entire movable bearing 4 is displaced along with the changing length. For this purpose, the radially inner part 9 includes a pressure pocket 21 formed therein, and the pressure pocket 21 is connected via a throttle or valve 22 with the line 16.

Torque support (not shown) is provided to prevent entrained rotation of the inner ring 8. Although not shown in FIG. 1, the torque support for the inner ring 8 of the movable bearing 4 (or for the inner ring 8 of the fixed bearing 3) may be provided in a similar manner to that shown in FIG. 2 (e.g., via an element similar to torque support 47) and described below with respect to the second embodiment.

FIG. 1 depicts that the bearing pocket 21 is connected to the same line 16 as the bearing pocket 14. Of course, the bearing pocket 21 may alternatively be provided with a separate hydraulic or pressurizing supply.

The inner part 9 of the inner ring 8 may be acted upon by a pressurized piston-cylinder arrangement 22 with a force F. The piston-cylinder arrangement 22 and the force F preferably acts in the axial direction. For this purpose, the piston-cylinder arrangement 22 has a piston 23 fixed on the carrier 5 and a ring cylinder 24 surrounding the piston 23. The piston 23, ring cylinder 24, and carrier 5 together bound a working area 25, which can be placed under a predefined fluid or hydraulic pressure via a line 26. In the working area 25, a spring 25a which pre-loads the ring cylinder 24 in the direction of the force F may also be disposed. With the hydraulic piston-cylinder arrangement 22, a constant force F can be maintained over a certain displacement path or stroke, a clearance being provided on the side of the bearing 4 opposite the arrangement 22.

The force F can be readily adjusted (either via the spring-pressure combination or pressure alone) depending on dimensions and forces such that the force F can be adapted to the different operating conditions. As noted, the bearing arrangement has a fixed bearing 3 and a movable bearing 4 and the piston-cylinder arrangement 22 acts on the movable bearing 4. Thus, it is possible to apply the necessary force (force F in FIG. 1) even with a displacement of the movable bearing 3, using the piston-cylinder arrangement 22. As noted above, the piston-cylinder arrangement and the movable bearing 4 must have the necessary displacement stroke and clearance (path) for the displacement, as shown for example, by an axial clearance between the inner ring 8 (of the movable bearing 4) and the carrier 5, on the side of the movable bearing 4 opposing the piston-cylinder arrangement 22. It should be noted that this axial clearance for the movable bearing 4 may compensate, as described above, for axial thermal expansion of the roll jacket 2, as well as provide a displacement range for the stroke of the piston-cylinder arrangement 22.

With the above-described structure, when the pressure in the line 16 is lowered or absent, the ring cylinder 24 pushes the inside ring 8 of the movable bearing 4, axially against the fixed bearing 3, for example, under the action of the spring 25a. Alternatively, since the piston-cylinder arrangement 22 is preferably provided with its own pressure supply 26, this second pressure supply 26 may provide a similar axial force in the absence of pressure in the (separate) line 16, with or without the spring 25a. The action of the piston-cylinder arrangement 22 closes the two gaps 20, 20 of the bearings 3, 4.

Conversely, when hydraulic pressure prevails in the line 16, which is necessary for the hydrostatic support of the bearing surfaces 18, the hydrostatic pressure must also overcome the axial force F of the piston-cylinder arrangement 22. With an appropriate adjustment of the pressure in the working area 25, it is thus possible to set the size of the gap 20 to an optimum value. Furthermore, the pressure in the working area 25 can be held at a constant value, independently of the displacement path through which the movable bearing 4 may travel with any (e.g., thermal) change in the length of the roll jacket 2.

At the same time as the functions noted above, the two bearings 3, 4 act as transverse end seals. During operation, no pressure can escape from the interior 6 through the gap 20, since a corresponding opposing pressure prevails in the gap 20. The corresponding opposing pressure in the gaps 20, 20 should be equal to or greater than the interior 6 pressure, but may be less. Thus, the gauge of the gap 20 can be set or maintained at a predefined value. When the hydrostatic pressure of the interior 6 drops or even disappears, for example, during an interruption in operation (when shut down), the gap 20 is closed by the axially acting force F such that no hydraulic fluid can leak from the hollow interior 6 of the roll jacket 1, 2 through the gap 20. Likewise, during operation, no fluid can leak from the interior or cavity 6 since the hydrostatic support pressure of the gaps 20 (usually, as noted above, at least as great as the hydraulic pressure in the cavity 6 of the roll jacket 1, 2) prevails in the gap 20. Hydraulic fluid will likely pass out through the nip or gap 20 because of the nature of the structure; however, no loss of pressure in the interior 6 of the roll jacket 1, 2 is associated with the loss of fluid. Since the function of a transverse end seal in this application is to maintain interior pressure rather than to conserve fluid, the bearings 3, 4 advantageously assume the additional function of transverse end seals.

FIG. 2 depicts a second embodiment. In FIG. 2, like reference numerals represent similar parts to those described above with respect to FIG. 1. Similar parts, where the structure and operation are identical to those of the first embodiment and are not provided with a separate description hereinafter, are generally considered to have the same (or insubstantially different) structures and functions as those previously described.

The bearings 31, 32 of the second embodiment are different from those of the first embodiment. However, again, the bearings 31, 32 are preferably identical to one another, i.e., reversible and exchangeable with one another.

Each bearing 31, 32 has a bearing housing 33, which has a projection 34 on an axially inner side thereof. The bearing housing 33 forms the inner ring of each bearing 31, 32, and a bearing race serves as an outer ring 35 of each bearing 31, 32. The outer ring 35 is divided in two parts 36, 37 in the radial direction, the radially inner part 36 being disposed (optionally hydrostatically) rotatably on the bearing housing 33. The radially inner part 36 of the outer ring 35 has a cap-shaped bearing surface (on its radially outer side), on which a radially outer part 37 of the outer ring 35 sits. Again, as with the first embodiment, the radially inner parts and radially outer parts preferably have a constant radius in the section depicted and constant radius perpendicular to the section depicted, and the two constant radii are preferably, but not necessarily, the same, with the roll axis as the center point. That is, the cap-shaped surface is preferably spherical. The radially outer part 37 has, on the radially inward side thereof, a concave arch surface corresponding to the convex arch surface (e.g., having matching radii). Again, the surfaces of the parts 36, 37, if spherical, may together constitute a spherical journal bearing (each having a spherical frustrum form). The contact surface between the two surfaces may be sealed by a seal, in this case, by two seals 37a.

Accordingly, in each of the first and second embodiments, each of first and second bearings 3, 4 or 32, 31 includes a (preferably) spherical journal bearing (e.g., surfaces 11–12 or surfaces of parts 36–37) formed therein for permitting relative tilt of the carrier 5 and the roll jacket 2, and each spherical journal bearing includes at least one seal 13 or 37a in an interfacing portion of the spherical journal bearing.

The radially outer part 37 of the outer ring 35 is fixedly connected to the roll jacket 2 both axially and in the direction of rotation. Accordingly, the radially inwardly positioned part 36 can tilt somewhat relative to the radially outward positioned part 37 of the outer ring 35 when the carrier 5 sags relative to the roll jacket 2. However, in the second embodiment, one axial tilting motion of the outer part 37 relative to the inner part 36 occurs here with every rotation of the roll jacket 2.

The outer ring 35 (more precisely, the radially inner part 36) is pressed by a pressure ring 38 against the projection 34 on the bearing housing 33. A disk spring 39, which is designed as a compression or pressure spring, facilitates the pressing. The disk spring 39 is supported against a projection 40 mounted on the bearing housing 33. The projection 40 is displaceable in the axial direction on the bearing housing 33 and fixable thereon, for example, with the help of a screw thread (not shown).

In the second embodiment, it is advantageous that the compression (disk) spring 39 acts on the thrust collar (pressure ring 38). Since, with this structure, no relatively large changes in length occur within the bearing 31 or 32, it is possible, by pre-loading the compression spring 39, to set a fixed value of the axial force (shown by arrow F in FIG. 2), the axial force F then being maintained during operation. In this case, it is preferable to design such a unit with one fixed bearing (e.g., bearing 32) and one bearing (e.g., bearing 31) movable or displaceable on the carrier 5.

The projection 34 has a pressure pocket 41 formed therein, on a side facing the outer ring 35. The pressure pocket 41 is connected via a throttle or valve 42 with the feed line 16. Similarly, the pressure ring 38 has a pressure pocket 43 formed therein on a side facing the outer ring 35, and the pressure pocket 43 is connected via a throttle or valve 44 with the line 16. The bearing housing 33 is provided on the radially outward side with a pressure or bearing pocket 45, e.g., formed in the outer circumferential surface of the bearing housing 33 facing the outer ring 35. The pressure or bearing pocket 45 is connected via a throttle or valve 46 with the line 16. Accordingly, when hydraulic fluid is then fed under a predetermined or adaptive pressure into the line 16, the gaps 50, 51, through which the hydraulic fluid can flow under pressure, are created in the region of the bearing pockets 41, 43, to enable hydrostatic bearing mounting and operation of the outer ring 35 on the bearing housing 33. The gaps 50, 51 are set by combination of the force of the spring 39 an the hydraulic pressure level to a favorable or optimum size.

Again, as with the first embodiment, with the above-described structure, when the pressure in the line 16 is lowered or absent, the spring 39 pushes the pressure ring 38, axially against the outer ring 35. The action of the spring 39 closes the two gaps 50, 51 in each of the bearings 31, 32. Conversely, when hydraulic pressure, which is necessary for the hydrostatic support of the bearing gaps 50, 51 (and/or at bearing pocket 45) prevails in the line 16, the hydrostatic pressure must also overcome the axial force F of the spring 39. With an appropriate adjustment of the pressure of the spring 39 it is thus possible to set the size of the gaps 50, 51 to an optimum value. The adjustment may be performed by, e.g., appropriate axial position adjustment of the projection 40 on the bearing housing 33.

That is, in the second embodiment, the bearing arrangement has at least one hydrostatic bearing 31 or 32 which has two gaps 50, 51 running in the circumferential direction and perpendicular to the axial direction and one gap (at pressure pocket 45) running in the circumferential direction and parallel to the axial direction. In contrast to the conventional structure, in the structure according to the second embodiment, however, the gaps 50, 51 are always kept "leak proof", i.e., the gaps 50, 51 are either closed, when the hydrostatic pressure is absent, or the gaps 50, 51 are automatically set to an optimum value when the hydrostatic action occurs.

In other words, in both the first and second embodiments, the hollow interior 6 is pressurized by the hydraulic system, and first and second hydrostatic gaps 20, 50, or 51 connect the hollow interior 6 and an exterior of the roll jacket 2. The first and second hydrostatic gaps 20, 50, or 51 may be pressurized by the hydraulic system to a pressure greater than or equal to (i.e., no less than) a pressure of the hollow interior 6, thereby maintaining the pressure of the hollow interior 6.

In the second embodiment shown in FIG. 2, the bearing 31 is designed as a movable bearing, which is displaceable in the axial direction on the carrier 5 within an axial clearance. A torque support 47 (also having an axial clearance) prevents entrained rotation of the bearing housing 33 on the carrier 5. The bearing housing 33 also has a bearing pocket 48 formed therein, which may be connected via a throttle or valve 49 with the line 16, such that the bearing housing 33 of the movable bearing 31 is supported hydrostatically on the carrier 5.

Accordingly, it is advantageous in the structure of the second embodiment that the movable bearing (in the second embodiment, bearing 31) is mounted hydrostatically on the carrier 5, and further that a torque support 47 is provided to prevent entrained rotation of the movable bearing 31 on the carrier 5. The hydrostatic mounting of the bearing 31 on the carrier 5 enables easier axial displacement. Since hydraulic fluid under pressure is available from the other hydrostatically supported members, no additional greater expense results from the hydrostatic mounting of the bearing 31 on the carrier 5. Advantageously, the opposing surface has a pressure pocket (e.g., pocket 45) which is disposed in a portion of the hydrostatic bearing (e.g., the inner surface of the housing 33) that is non-rotatable relative to the carrier 5. This simplifies the supply of the hydraulic fluid required for the buildup of the necessary hydrostatic pressure.

In the second embodiment, each outer ring 35 is accommodated in its own bearing housing 33, such that each outer ring 35 is axially supported hydrostatically on both axial sides. Accordingly, the entire bearing 31 is preferably displaceable. That is, it is particularly preferred that the radially inner portion 36 of the outer ring 35, which is axially gripped between a projection 44 and a thrust collar (pressure ring 40), is disposed on the bearing housing 33. The bearing 31 thus forms a unit which can be handled as a whole, and in which, for example, it is possible to slide the bearing carrier housing (bearing housing 33) onto the carrier 5. The axially oriented force F then acts against the thrust collar (pressure ring 40), which axially holds the radially inner part 36 of the outer ring 36, which is connected with the roll jacket 1, 2, e.g., via the radially outer portion 37.

In the embodiments depicted in FIGS. 1 and 2, the roll jacket 2 is centered relative to the carrier or crosspiece 5. Such a roll is referred to as a "C-type" roll. In the embodiments shown in FIGS. 1 and 2, the bearing arrangements 3, 4 and 31, 32 are substantially fixedly disposed on the crosspiece 5.

However, if a roll with jacket lift is desired, the bearing arrangements 3, 4 may be attached on an alternative carrier instead of on the crosspiece, where the carrier is movable in a plane relative to the crosspiece. In this case, it is possible to raise or lower the roll jacket 2 through the action of the support elements 7, i.e., to change the orientation and/or position of the axis of rotation of the roll jacket 2 to the central axis of the crosspiece 5.

Thus, according to the invention, the bearing arrangement has at least one bearing (e.g., 3, 4, 31, 32) with an inner ring (e.g., 8, 33) and an outer ring (e.g., 19, 35) whereby one of the two rings (e.g., inner ring 8 or outer ring 35) is divided in two parts (e.g., 9, 10 or 36, 37), and the radially inner part (e.g., 9 or 36) has an arcuate concave surface on its radially external side, while the radially outer part (e.g., 10 or 37) has a arcuate convex surface adapted thereto. The arcuate surfaces are arcuate in at least a cross-section taken along a plane containing the bearing axis. The two arcuate surfaces thus work together such that the outer ring can execute a tilting motion on the inner ring; or the inner ring, with respect to the outer ring. Thus, the potential for sagging of the carrier 5 which passes through the roll jacket 2 is taken into account. Under sagging, the carrier 5 may have, on the ends where the bearing or bearings (e.g., 3, 4, 31, 32) are disposed, a certain inclination, such that the axis of the carrier 5 at the ends no longer coincides with the rotational axis of the roll jacket 2. However, by providing an arcuate bearing in the form of the arcuate or spherical bearing surfaces, tilting is permitted without additional wear occurring.

Preferably, the radius of the arcuate surfaces is constant, or further, the arcuate surfaces form a spherical bearing. Thus, particularly large tilt angles can be realized without the risk that the pressure in the interior 6 can leak at the contact surface between the inner ring and the outer ring.

In other words, the pressure processing roll 1 of the first and second embodiments includes a substantially cylindrical roll jacket 2 having a hollow interior 6 and a carrier 5 within the roll jacket 2, the carrier 5 extending along a rotational axis of the roll jacket 2. A first bearing 3 or 32 at one end of the roll jacket 2 and a second bearing 4 or 31 at the remaining end of the roll jacket 2 connect the carrier 5 and the roll jacket 2. The first and second bearings each have a hydrostatic gap 20, 50, or 51 between two internal surfaces of the bearing that are transverse (e.g., inclined or perpendicular) to the rotational axis of the roll jacket 2, and the hydrostatic gaps 20, 50, or 51 hydrostatically support the ends of the roll jacket 2 when pressurized by a hydraulic system. A gap closing mechanism 22 or, e.g., 39, 40, and/or 44, applies pressure to at least the second bearing 4 or 31 (or the first bearing 32 as well) in a direction, also transverse to the rotational axis, to close the first and second hydrostatic gaps 20, 50, or 51 when the hydraulic pressure in the first and second hydrostatic gaps 20, 50, or 51 is lower than a predetermined pressure (e.g., lowered pressure or no pressure). The gap closing mechanism closes off the hollow interior 6 of the roll jacket 2 by closing the first and second hydrostatic gaps 20, 50, or 51.

While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent and/or insubstantially different structures, such as are within the scope of the appended claims.

What is claimed is:

1. A pressure processing roll having a rotating axis, comprising:

a carrier;

a roll jacket;

a bearing arrangement that rotatably mounts the roll jacket on the carrier, the bearing arrangement having at least one hydrostatically supported bearing surface that forms a gap with an opposing surface, a normal force of said hydrostatically supported bearing surface having an axially oriented component in a direction of the rotating axis; and an axial pressure mechanism that applies a predetermined, axially oriented force on the bearing arrangement in the direction of said axis to substantially completely close the gap in the absence of hydrostatic pressure in said at least one hydrostatically supported bearing surface.

2. The pressure processing roll according to claim 1, wherein said bearing arrangement includes at least one bearing having an inner ring and an outer ring, one of said inner and said outer ring being divided in two in a radial direction of said pressure processing roll into a radially inner part and a radially outer part, the radially inner part having a concave arch on a radial outer side, and the radially outer part having a convex arch on a radially inner side adapted to the concave arch.

3. The pressure processing roll according to claim 2, wherein said concave arch and said convex arch each have a constant radius.

4. The pressure processing roll according to claim 2, wherein said inner ring is divided in two in said radial direction into said radially inner part and said radially outer part.

5. The pressure processing roll according to claim 1, wherein said axial pressure mechanism includes a hydraulic piston-cylinder arrangement that generates the predetermined, axially oriented force.

6. The pressure processing roll according to claim 5, wherein said bearing arrangement has a fixed bearing and a movable bearing, and said hydraulic piston-cylinder arrangement applies the predetermined, axially oriented force on said movable bearing to substantially completely close the gap in the absence of the hydrostatic pressure.

7. The pressure processing roll according to claim 1, wherein the bearing arrangement comprises two hydrostatic bearings, said two hydrostatic bearings having gaps that are conically inclined with an opposing angle of inclination to one another.

8. The pressure processing roll according to claim 1, wherein said bearing arrangement includes at least one hydrostatic bearing which has two gaps running in the circumferential direction and perpendicular to the direction of the rotating axis and one gap running in the circumferential direction and parallel to the direction of the rotating axis.

9. The pressure processing roll according to claim 8, wherein said at least one hydrostatic bearing includes a bearing housing, an outer ring, a projection, and a pressure ring, and wherein said outer ring is disposed on said bearing housing and gripped in the direction of the rotating axis between said projection and said pressure ring.

10. The pressure processing roll according to claim 9,
said at least one hydrostatic bearing further including a pressure spring that acts on said pressure ring.

11. The pressure processing roll according to claim 1,
wherein said opposing surface has a pressure pocket formed therein, said opposing surface and said pressure pocket being formed in a portion of said bearing arrangement that is not rotatable relative to the carrier.

12. The pressure processing roll according to claim 8,
wherein said opposing surface has a pressure pocket formed therein, said opposing surface and said pressure pocket being formed in a portion of said at least one hydrostatic bearing that is not rotatable relative to the carrier.

13. The pressure processing roll according to claim 6, wherein the movable bearing is hydrostatically mounted on the carrier.

14. A pressure processing roll connectable to a hydraulic system, comprising:
a substantially cylindrical roll jacket having a hollow interior;
a carrier within said roll jacket, said carrier extending along a rotational axis of said roll jacket;
a first bearing at one end of the roll jacket and connecting said carrier and said roll jacket, said first bearing having a first hydrostatic gap between two internal surfaces of said first bearing that are transverse to the rotational axis, said first hydrostatic gap hydrostatically supporting said one end of said roll jacket when pressurized by the hydraulic system;
a second bearing at a remaining end of said roll jacket and connecting said carrier and said roll jacket, said second bearing having a second hydrostatic gap between two internal surfaces of said second bearing that are transverse to the rotational axis, said second hydrostatic gap hydrostatically supporting said remaining end of the roll jacket when pressurized by the hydraulic system; and
a gap closing mechanism for applying pressure to said second bearing in a direction transverse to said rotational axis, to close said first and second hydrostatic gaps when said hydraulic pressure in said first and second hydrostatic gaps is lower than a predetermined pressure, said gap closing mechanism closing off said hollow interior of said roll jacket by closing said first and second hydrostatic gaps.

15. The pressure processing roll according to claim 14,
wherein said first bearing is fixed in the direction of the rotational axis, and wherein said second bearing is movable within a clearance in the direction of the rotational axis.

16. The pressure processing roll according to claim 15,
wherein said gap closing mechanism applies pressure to said second bearing in an axial direction of the rotational axis to close said first and second hydrostatic gaps.

17. The pressure processing roll according to claim 14,
wherein said hollow interior is pressurized by the hydraulic system, and said first and second hydrostatic gaps connect said hollow interior and an exterior of said roll jacket, said first and second hydrostatic gaps being pressurized by the hydraulic system to a pressure no less than a pressure of said hollow interior, thereby maintaining said pressure of said hollow interior.

18. The pressure processing roll according to claim 14,
wherein said two internal surfaces of each of said first and second bearings are conically shaped, said two internal surfaces of said first bearing having an opposing angle of inclination to said two internal surfaces of said second bearing.

19. The pressure processing roll according to claim 14,
wherein said two internal surfaces of each of said first and second bearings extend circumferentially about the rotational axis and perpendicular to the rotational axis.

20. The pressure processing roll according to claim 14,
each of said first and second bearings further comprising a spherical journal bearing formed therein for permitting relative tilt of said carrier and said roll jacket.

21. The pressure processing roll according to claim 19,
each spherical journal bearing comprising at least one seal in an interfacing portion of the spherical journal bearing.

* * * * *